United States Patent [19]
Castelli et al.

[11] Patent Number: 5,754,931
[45] Date of Patent: May 19, 1998

[54] DIGITAL PRINTING BLANKET CARASS

[75] Inventors: Francesco Castelli; Giampietro Invernizzi, both of Lodi, Italy

[73] Assignee: Reeves Brothers, Inc., Spartanburg, S.C.

[21] Appl. No.: 660,899

[22] Filed: Jun. 10, 1996

[51] Int. Cl.⁶ .................................................. G03G 15/16
[52] U.S. Cl. ........................... 399/297; 399/308; 428/909; 430/48
[58] Field of Search ........................... 399/297, 302, 399/303, 308, 313, 329; 430/42, 32, 48; 428/909

[56] References Cited

U.S. PATENT DOCUMENTS

| | | | |
|---|---|---|---|
| 3,615,972 | 10/1971 | Morehouse, Jr. et al. | 156/79 |
| 4,303,721 | 12/1981 | Rodriguez | 428/213 |
| 4,422,895 | 12/1983 | Shimura et al. | 428/909 X |
| 4,548,858 | 10/1985 | Meadows | 428/909 X |
| 4,812,357 | 3/1989 | O'Rell et al. | 428/909 X |
| 5,089,856 | 2/1992 | Landa et al. | 399/308 |
| 5,205,213 | 4/1993 | Bresson | 428/909 X |
| 5,293,537 | 3/1994 | Carrish | 399/329 |
| 5,294,481 | 3/1994 | Nakamura et al. | 428/909 X |
| 5,334,418 | 8/1994 | Byers et al. | 428/909 X |

*Primary Examiner*—S. Lee
*Attorney, Agent, or Firm*—Pennie & Edmonds

[57] ABSTRACT

The present invention relates to a digital printing blanket carcass for supporting a transfer layer having an outer surface which is capable of transferring electrostatic particles. This carcass includes an upper layer of a resilient material which can withstand a temperature of up to about 150° C., such as silicone rubber, hydrogenated nitrile rubber, an acrylic rubber or a fluoroelastomer; a compressible layer of an elastomeric matrix material having a plurality of open or closed cells therein; and a fabric layer of a fiber material which can withstand a temperature of up to about 150° C., such as carbon, boron, a metal, fiberglass, a polyimide, or an aromatic polyamide.

10 Claims, 1 Drawing Sheet

DIGITAL PRINTING BLANKET CARASS

TECHNICAL FIELD

The present invention relates to a digital printing blanket carcass which is capable of withstanding the relatively high temperatures that are experienced during various digital transfer techniques such as is involved in the electrostatic imaging of liquid or powder toners in or photocopiers or digital printing devices.

BACKGROUND ART

Electrostatic imaging of liquid or solid toner materials is well-known in the art as a convenient method for printing or copying text. In both the liquid and powder toner systems, the images are typically generated on a drum, moved to a heated member, and then transferred to the final substrate.

U.S. Pat. No. 5,089,856 discloses an imaging system which includes a transfer member for transferring toner images from an image bearing surface to a substrate. In this type device, it is important for the transfer surface and supporting layers to be resistant to relatively high heat. This heat is generated due to the application of a voltage to both the internal heating coils of the transfer member as well as between the transfer member and the drum to facilitate transfer of the image. Thus, the transfer member should be able to withstand temperatures of as high as about 130° to 150° C.

Since heating is a necessary operation in order to obtain good transfer of the toner, it would be advantageous to provide the heating coils close to the surface of the transfer layer, rather than on the opposite side of a compressible layer. Such transfer layers are often manufactured separately by the imaging machine manufacturer so that the appropriate performance requirements are met, i.e., that the transfer layer is resistant to the heating temperatures and is also suitable for carrying and transferring the toner particles from the drum to the substrate. Such transfer layers require a carcass or support so that they can be properly mounted onto the printing machine as well as to provide or impart the necessary properties such as compressibility and resilience to the transfer layer. Such carcasses must also be resistant to the high temperatures that are encountered in this type of printing system. The present invention provides a new carcass construction which is highly suitable for use in connection with such transfer layers.

SUMMARY OF THE INVENTION

The present invention relates to a digital printing blanket carcass for supporting a transfer layer having an outer surface which is capable of transferring electrostatic particles. This carcass includes an upper layer of a resilient material, a compressible layer, and a fabric layer of a fiber material; each of which can withstand a temperature of up to about 150° C.

In this carcass, either of the top layer or compressible layer comprises silicone rubber, hydrogenated nitrile rubber, an acrylic rubber or a fluoroelastomer, the compressible layer further includes a plurality of open or closed cells therein, and the fiber of the fabric layer comprises carbon, boron, a metal, fiberglass, a polyimide, or an aromatic polyamide. Advantageously, the elastomeric material of the top layer and compressible layer is the same to facilitate the joining of these layers. If necessary, a layer of an adhesive which can withstand a temperature of up to about 150° C. can be applied for securing the upper layer to the compressible layer.

Preferably, the fabric layer is woven and the carcass includes means for mounting the carcass onto a rotatable cylinder. The mounting means may be a layer of an adhesive which can withstand a temperature of up to about 150° C. and a layer of a polymer film for protecting the adhesive layer. A silicone adhesive layer is preferred.

BRIEF DESCRIPTION OF THE DRAWINGS

The present invention will be understood and appreciated more fully from the following detailed description of the preferred environments taken in conjunction with the accompanying drawing which is a cross-sectional view of a digital printing blanket that incorporates the carcass of the present invention.

DETAILED DESCRIPTION OF THE PREFERRED EMBODIMENTS

Figure 1:
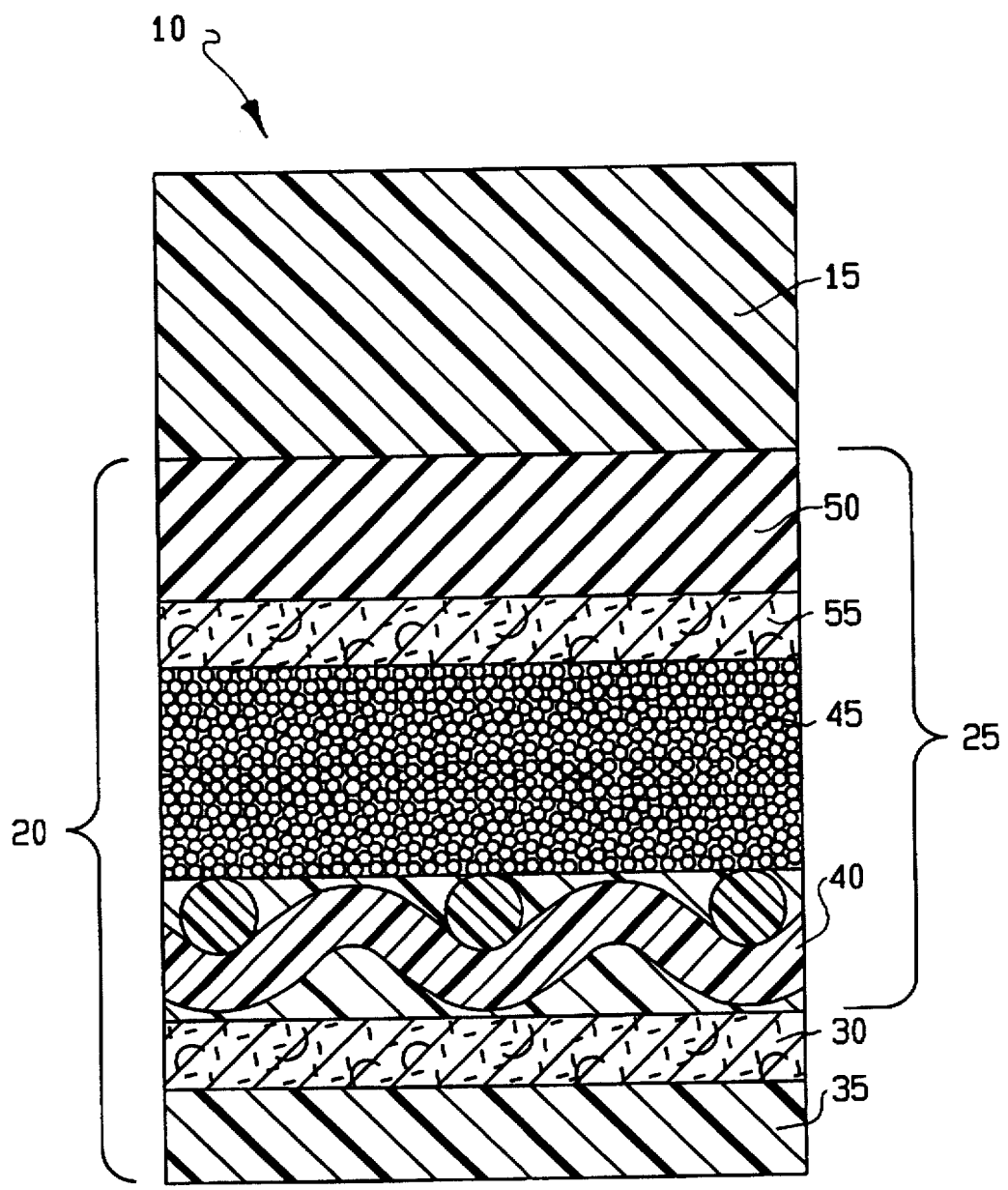

As illustrated in the FIG. 1, the digital printing blanket 10 of the present invention includes several layers which laminated or otherwise processed into a single unitary structure. For convenience in understanding the invention, each of these layers, together with their associated features, will be discussed below in turn.

For purposes of the present invention, the terms "bottom", "lower" and the like are used to refer to that portion of a layer which is most nearly adjacent the device upon which the blanket of the invention is installed. Conversely, the "top" or "upper" portion of a layer is that portion thereof which is located or positioned furthest from the device.

As explained above, the uppermost layer of this blanket 10 is a member 15 for transferring an electrostatic image of toner particles from an image bearing surface to a substrate. As noted above, a typical transfer member is illustrated in U.S. Pat. No. 5,089,856. This transfer member can be made by the printing apparatus manufacturer so that it is specifically designed and adapted for the particular toner and electrostatic imaging apparatus that is utilized. The most preferred transfer member 15 is manufactured by Indigo NV, Woburn, Mass. for use in their digital printing machines. This transfer member is proprietary to Indigo and is simply laminated conventionally onto the carcass 20 of the present invention. If desired, a high temperature adhesive such as a silicone adhesive can be used to secure the transfer member to the carcass.

The present invention relates to the carcass 20 for supporting the transfer member 15. A common feature which is present in the various layers of the carcass 20 is that each has sufficient heat resistance to withstand a temperature of about 150° C. By "heat resistance", what is meant is that the material retains its mechanical characteristics such as tensile strength, elongation, hardness and tear resistance without substantial deterioration at the desired temperature, which for this invention is at least about 150° C.

The carcass 20 is comprised of a high temperature resilient layer 25 and an adhesive layer 30 for securing the carcass 20 to the printing apparatus. The adhesive layer 30 is applied to the lowermost surface of the carcass. The adhesive which is used is preferably one which is compatible with the carcass material and the printing apparatus so that it can secure the blanket 10 in position as desired. Preferably the adhesive will be a silicon or fluorocarbon material to resist the relatively high temperatures that occur when the transfer member or the apparatus is heated. A preferred silicon adhesive is available from Dow Corning and is known as No. Q2/7406. The adhesive is applied to a thickness of about 0.01 to 0.05 mm, and preferably at about 0.03 mm.

To prevent sticking of the adhesive when not desired, a polymer film 35 is applied over the adhesive. This film, which can be made of any polyolefin and is most preferably polyethylene or a polyester material, is applied in such a manner that it can be peeled away or otherwise removed from the adhesive before the carcass is secured to the printing apparatus. The printing apparatus is typically aluminum or some other metal because the apparatus is usually heated to assist in providing the proper temperature for the transfer of toner particles from the imaging apparatus to the substrate. A typical polyester film is available from H. P. Smith Inc. and is known as DP 5648. This film is present at a thickness of about 0.5 to 1 mm, preferably about 0.77 mm. Since this film is removed before the carcass 20 or blanket 10 is placed into service, there is no need for the film to have high temperature resistance properties like the other layers of the carcass and blanket.

The resilient layer 25 has three components: a fabric base 40, a compressible layer 45 and a high temperature resistant resilient top layer 50. The fabric base includes one or more relatively high temperature resistant fibers, and is used to support the other layers. The fibers may be in the form of a continuous filament, strand or yarn, as a mat, or preferably, as a structure of woven filaments. Many different types of fibers may be used for this layer. Suitable fiber materials include carbon, boron, fiberglass, high temperature resistant plastics or any of a wide variety of metals or alloys. The high temperature aromatic polyamide or polyimide plastics are preferred. Any of the cited materials can be used, preferably in the form of a woven fabric or cloth and at a thickness of between about 0.1 to 0.5 mm and preferably about 0.15 to 0.3 mm.

The most advantageous material as far as performance, cost and availability is concerned is a woven NOMEX fabric which is available from DuPont, Wilmington, Del. This fabric has a thickness of 0.21 mm, with 20 warp threads and 19 fill threads. NOMEX is basically an aromatic polyamide that chars at 420° C., so that it has the required high temperature resistance for use in this layer.

On the upper side of the fabric layer 40 is applied a compressible layer 45. Any one of a wide variety of compressible layers can be used. The temperature resistance of the compressible layer must also be sufficiently high to withstand the anticipated operating conditions.

To form the compressible layer 45, fabric 40 may be spread coated, calendared, dipped or otherwise contacted, upon its upper surface with a matrix material which includes microspheres therein. Suitable matrix materials include those thermoplastic or thermosetting resins, polyurethanes, and natural or synthetic elastomers which are resistant to a temperature of 150° C. One skilled in the art is aware of a variety of techniques for applying these materials in liquid form (i.e., by a solvent solution or a latex dispersion) upon a fabric substrate.

Elastomers are preferred for use as the matrix material. Useful elastomeric materials for matrix of the compressible layer 45 include acrylonitrile rubber, acrylic rubber or silicon rubber or an elastomer or plastic made from a fluorocarbon material. The elastomers best suited for this invention are the hydrogenated nitrile or acrylic rubbers. These elastomers are preferably applied to the fabric by a solvent carrier.

The matrix material additionally contains a plurality of cells therein in an amount sufficient to impart increased compressibility to the layer. These cells may be closed cells formed with the use of the microspheres. Generally, microspheres are formed from materials such as, e.g., thermoplastic resins, thermosetting resins, ceramics, glass and sintered metals. There is no particular concern as to the temperature resistance of these microspheres, since they are converted into cells or voids in the matrix material prior to use of the carcass and blanket. Of course, the curing of the compressible layer will depend upon the type and melting temperature of the particular microspheres used.

A preferred thermosetting resin for forming the microspheres used in the invention is a phenolic resin having a density of between about 0.01 and 0.05 grams per cubic centimeter. The microspheres range in diameter between about 1–200 and preferably 50–130 microns, with an average size of about 90μ being most preferred. They are dispersed relatively uniformly throughout the matrix material such that, upon application of the matrix to the fabric ply, the microsphere loaded material described herein will form the desired thickness of the layer. Typically the compound is applied to fabric to form the compressible layer thereupon by depositing a number of thin layers of about 0.002 mm in successive applications.

Generally, the microspheres are uniformly distributed throughout the elastomer in such a way as to avoid any appreciable crushing of the microspheres. Additionally, the microspheres are incorporated in the elastomeric material at a loading of about 4–90% and preferably 10–70% of the solid contents. This percentage will vary based on such factors as microsphere dimension, wall thickness and bulk density, or if blowing agents are additionally incorporated within the matrix.

To form the cells in the embodiment described above, any of a wide variety of microspheres can be added to a solution or dispersion of the matrix. If solvent solutions are utilized, the selected microspheres must be resistant to chemical attack from the solvents.

Several acceptable types of thermoplastic microspheres for use with the present invention are marketed, for example, by EXPANCEL and Pierce & Stevens. Microspheres of a thermoset resin are preferred for this embodiment. Most preferred are those formed of a phenolic resin having a density of between about 0.2 and 0.03 gms/cc and most preferably about 0.023 gms/cc.

Once the microspheres are dispersed in the matrix and the matrix is applied to the fabric, the thus coated fabric is then, for example, passed over hot cans or festooned or passed through an oven at a temperature sufficient to cause complete expansion of the microspheres so that the compressible layer is secured to the fabric. However, if pre-expanded microspheres are utilized, the heating step described above may be eliminated.

If desired, the microspheres may further include a coating thereon to facilitate their bonding with the matrix material. Pierce & Stevens markets microspheres under the trade name DUALITE, which includes any one of a variety of coatings thereupon, such as talc, calcium carbonate, zinc oxide, titanium dioxide, mica, calcium sulfate, barium sulfate, antimony oxide, clay, silica, and aluminum trihydrate. Proper selection of the sphere/coating composite further enhances the bonding between the fabric and the elastomer matrix. U.S. Pat. No. 3,615,972 to Morehouse, the disclosure of which is incorporated herein by reference, discloses a number of techniques used in manufacturing microspheres of the type suitable for use in the present invention.

In an alternate embodiment, cells may be formed in the matrix by mechanically inducing air into a matrix forming material before it is applied to the fabric, such as by aerating or stirring. Another means of creating cells is to use chemical blowing agents (the term foaming agents also is used) that are decomposable into gases as they are cured in a compound. One such class of blowing agents are the CELLOGENS™ which are manufactured by Uniroyal (CELLOGEN is a registered trademark of Uniroyal). CELLOGENS are decomposable in the presence of heat, which may be applied during curing. Many other types of blowing agents are commercially available with a wide range of decomposition characteristics, such as those set forth in U.S. Pat. No. 4,548,858 to Meadows, the disclosure of which is expressly incorporated herein by reference.

Compressible layer may be separately formed and adhered to the fabric with, for example, the use of a layer of a suitable adhesive which is compatible with both the compressible layer and the top resilient layer. This adhesive can be a compounded nitrile rubber but a variety of water and solvent based elastomeric adhesives, which are well known in the art may be used, if desired, in its place. The particular adhesive will depend upon the specific material utilized to form the top layer 50. Bonding of the compressible layer may alternately or additionally be effected by a chemical reaction occurring between fabric 40 and the compound triggered during the subsequent curing process. Advantageously, the adhesive should be resistant to at least about 150° C. in order to withstand the anticipated operating temperatures for the carcass and blanket.

Another method for preparing the compressible layer is the well-known salt leaching process as disclosed, e.g., in U.S. Pat. No. 4,422,895, the disclosure of which is expressly incorporated herein by reference. It is this procedure which is preferred for making the compressible layer of the present invention. This compressible layer is directly applied to the fabric 40 at a thickness of between about 0.15 to 0.8 mm, and preferably at about 0.036 mm.

On the uppermost portion of the compressible layer is applied a top layer 50 of a high heat resistant resilient material. "Resilient" means that the material is capable of being expanded or compressed while still being able to return to substantially its initial configuration. This layer preferably retains its resiliency up to a temperature of approximately 150° C.

Useful materials for top layer 50 include hydrogenated nitrile rubber, acrylic rubber or silicon rubber or an elastomer or plastic made from a fluorocarbon material. This layer typically has a thickness of between about 0.01 and 0.5 mm, and preferably about 0.05 to 2 mm. Depending upon the selection of the particular material for the top layer 50 as well as that which is selected for the compressible layer 45, it may be necessary to utilize an adhesive 55 to secure the top layer to the compressible layer. As noted above, the preferred adhesive for use at the relatively high temperatures expected would be one that is based on a silicone material. The preferred material for the top layer 50 is a hydrogenated nitrile rubber such as THERBAN 1746S which is available from Bayer or ZETPOL 2020L which is available from Nippon Zeon. This layer is applied at a thickness of about 0.1 mm.

The preferred method of manufacturing of the present carcass includes the following steps. The compressible layer 45 of a hydrogenated nitrile rubber is applied to the fabric 40 in a solvent solution by spread coating followed by a conventional salt leaching process to create open cells therein. The compressible layer is cured in a conventional manner. Thereafter, a top layer of a hydrogenated nitrile rubber is applied onto the compressible layer by spread coating and is also cured conventionally. The top layer is then buffed with sandpaper to the final thickness.

When the adhesive layer 30 is to be applied, the carcass is turned over and an adhesive is spread onto the bottom of the fabric layer; A polyester film is applied upon the adhesive in a final operation. This product is then shipped to the printing machine manufacturer, who applies the appropriate transfer layer upon the top layer. The blanket can then be mounted upon a printing apparatus by removing the film and applying the adhesive coated fabric side to the metal base of the printing device.

What is claimed is:

1. A digital printing blanket carcass for supporting a transfer layer having an outer surface which is capable of transferring electrostatic particles, said carcass comprising:

an upper layer of a resilient material which can withstand a temperature of up to about 150° C.;

a compressible layer which can withstand a temperature of up to about 150° C.;

a layer of a first adhesive which can withstand a temperature of up to about 150° C. for securing the upper layer to the compressible layer;

a fabric layer of a fiber material which can withstand a temperature of up to about 150° C.; and a layer of a second adhesive which can withstand a temperature of up to about 150° C. on the fabric layer for mounting the blanket.

2. The carcass of claim 1 further comprising a layer of a polymer film for protecting the second adhesive.

3. The carcass of claim 1 wherein the first adhesive comprises a silicone adhesive.

4. The carcass of claim 1 wherein the compressible layer comprises an elastomeric material having a plurality of cells therein.

5. The carcass of claim 1 wherein either of the upper layer or the compressible layer comprises silicone rubber, hydrogenated nitrile rubber, an acrylic rubber or a fluoroelastomer.

6. The carcass of claim 1 wherein the fiber of the fabric layer comprises carbon, boron, a metal, fiberglass, a polyimide, or an aromatic polyamide.

7. The carcass of claim 1 wherein the second adhesive comprises a silicone adhesive.

8. A digital printing blanket carcass for supporting a transfer layer having an outer surface which is capable of transferring electrostatic particles, said carcass comprising:

an upper layer of a resilient material comprising silicone rubber, hydrogenated nitrile rubber, an acrylic rubber or a fluoroelastomer;

a compressible layer of silicone rubber, hydrogenated nitrile rubber, an acrylic rubber or a fluoroelastomer, which layer has a plurality of cells therein;

a layer of a first adhesive which can withstand a temperature of up to about 150° C. for securing the upper layer to the compressible layer;

a woven fabric layer of a fiber material comprising carbon, boron, a metal, fiberglass, a polyimide, or an aromatic polyamide; and a layer of a second adhesive which can withstand a temperature of up to about 150° C. on the fabric layer for mounting the blanket.

9. The carcass of claim 8 further comprising a polymer film for protecting the second adhesive.

10. The carcass of claim 8 wherein the upper layer is a hydrogenated nitrile rubber, the compressible layer is a hydrogenated nitrile rubber having a plurality of open cells therein, and the woven fabric comprises an aromatic polyamide.

* * * * *